(12) United States Patent
Hayashi (10) Patent No.: US 7,790,218 B2
(45) Date of Patent: Sep. 7, 2010

(54) METHOD AND APPARATUS FOR FORMING ELECTRODE FOR BATTERY

(75) Inventor: Tetsuya Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 732 days.

(21) Appl. No.: 11/706,336

(22) Filed: Feb. 15, 2007

(65) Prior Publication Data
US 2007/0231465 A1 Oct. 4, 2007

(30) Foreign Application Priority Data
Mar. 30, 2006 (JP) ............................. 2006-094005

(51) Int. Cl.
B05D 5/12 (2006.01)
B05D 3/12 (2006.01)
H01M 4/04 (2006.01)
B05C 11/02 (2006.01)

(52) U.S. Cl. ..................... 427/58; 427/359; 427/277; 427/356; 427/357; 427/358; 118/110; 118/123; 118/126; 118/672

(58) Field of Classification Search .............. 427/277, 427/356, 357, 358, 58, 79, 359, 286, 8, 9, 427/10; 118/110, 123, 126, 672, 665, 712, 118/102
See application file for complete search history.

(56) References Cited
U.S. PATENT DOCUMENTS
5,755,883 A * 5/1998 Kinose et al. ............... 118/110

FOREIGN PATENT DOCUMENTS
JP 2005-183181 7/2005
JP 2005-216722 8/2005
JP 2005-216723 8/2005

* cited by examiner

Primary Examiner—Shamim Ahmed
Assistant Examiner—Mahmoud Dahimene
(74) Attorney, Agent, or Firm—McDermott Will & Emery LLP (57) ABSTRACT

A method for forming an electrode for a battery includes the step of rotating a gravure roll while allowing the gravure roll to abut against the surface of an electrode, thereby applying a coating fluid serving as a precursor of a porous layer on the surface of the electrode. In this step, part of the coating fluid applied to the surface of the electrode is continuously removed by allowing a scraper to abut against the surface of the electrode, and the width of a part of the scraper abutting against the surface of the electrode is adjusted according to variations in the width of each of linear portions of the porous layer left after the removal of the part of the coating fluid.

8 Claims, 5 Drawing Sheets

| | Shape of scraper | Sensing and control of exposed part width of mixture layer | Exposed part width of mixture layer | |
|---|---|---|---|---|
| | | | Average width (mm) | Range of variation (σ) |
| Example 1 | FIG. 2A | Performed | 10.1 | 0.2 |
| Example 2 | FIG. 3A | Performed | 10.0 | 0.1 |
| Comparative Example 1 | FIG. 5A | Not performed | 10.3 | 0.3 |

METHOD AND APPARATUS FOR FORMING ELECTRODE FOR BATTERY

CROSS-REFERENCE TO RELATED APPLICATIONS

The disclosure of Japanese Patent Application No. 2006-094005 filed on Mar. 30, 2006 including specification, drawings and claims is incorporated herein by reference in its entirety.

BACKGROUND OF THE INVENTION (1) Field of the Invention

The present invention relates to methods for forming porous layers on the outer surfaces of electrode hoops of nonaqueous electrolyte secondary batteries or other batteries.

(2) Description of Related Art

As portable electronic devices and cordless electronic devices have come to be more widely used, expectations are growing for lightweight nonaqueous electrolyte secondary batteries with high energy density. However, an active material of such a nonaqueous electrolyte secondary battery is made of highly reactive lithium, and therefore a short circuit between a positive electrode and a negative electrode under abnormal conditions generates heat. Due to the generated heat, a resinoid microporous membrane separator for isolating the positive electrode from the negative electrode melts around the area in which the electrodes are short-circuited, thereby increasing the area in which the electrodes are short-circuited and thus generating abnormal superheat. In order to prevent this, a technique is being used in which, in case of the occurrence of a short circuit between electrodes, superheat due to an increase in the area where the electrodes are short-circuited is suppressed by combining a porous refractory layer having a refractory resin or an inorganic oxide as the main ingredient with the resinoid microporous membrane separator.

Such a porous refractory layer is formed on the outer surface of a positive electrode or a negative electrode (hereinafter, referred to as an "electrode") without loss of the design capacity of a battery to have a thickness of 2 through 10 µm. A method in which a coating fluid serving as a precursor of a porous refractory layer is transferred to a gravure roll provided with a plurality of grooves and the transferred coating fluid is applied to the outer surface of a target electrode hoop (hereinafter, referred to as "gravure method") is preferably employed as a method for forming a layer of a thickness as described above with high accuracy. In order to realize the gravure method, the direction in which an electrode hoop travels is allowed to become opposite to the direction of rotation of a gravure roll. In this way, a thin coating membrane can be formed on the outer surface of an object to be coated with a coating fluid with high accuracy.

By the way, from the viewpoint of improving the productivity of electrodes, electrodes each serving as a base of a porous refractory layer are typically processed in the following manner: A core that is several times as wide as each electrode itself is prepared; a plurality of linear portions of a mixture layer containing an active material are formed on the core; and then the core is cut into pieces each having one of the linear portions of the mixture layer. In view of the above, a plurality of porous refractory layers need be formed in consideration of the shape of each electrode.

A method in which a masking tape is bonded to the outer surface of a core, then a mixture layer is formed on the masking tape, and thereafter the masking tape is removed has been disclosed, as a method for forming a mixture layer on the outer surface of a core with high accuracy, in Japanese Unexamined Patent Publications Nos. 2005-183181, 2005-216722 and 2005-216723. Application of this method allows a plurality of linear portions of a porous refractory layer each having a predetermined width to be formed on the outer surface of an electrode.

SUMMARY OF THE INVENTION

In a method in which the width of a porous refractory layer is controlled using a masking tape, when the masking tape is removed from the core, a mixture layer may also be separated from the core. Furthermore, use of masking tapes as consumable items increases the production cost.

To cope with the problems, the present inventors studied use of the following method instead of the method in which the masking tape is used. In the method studied by the present inventors, a resin piece or the like is allowed to abut against the outer surface of a mixture layer of an electrode, and then part of a coating fluid thus applied through a gravure roll to the outer surface of the mixture layer is continuously removed so that a plurality of linear portions of a porous refractory layer each having a predetermined width are left to extend in parallel with the direction of movement of the gravure roll.

However, it has been found that since a material of a porous refractory layer often contains a substance having a relatively high specific gravity, such as an inorganic oxide filler, this causes the following problems. More specifically, in order to form a porous refractory layer containing such a material using a gravure method to have a small thickness of 2 through 10 µm, unlike a coating fluid serving as a precursor of a mixture layer, a coating fluid serving as a precursor of a porous refractory layer is a Newtonian fluid having a reduced viscosity. Therefore, the sinkability of the coating fluid significantly varies with time. Furthermore, production lots tend to have different characteristics.

As seen from the above-mentioned features of the coating fluid, in the process of applying the coating fluid to an object for a long time, e.g., the process of supplying the coating fluid to a plurality of production lots, the coating fluid has a difference in its properties between the beginning of application of the coating fluid and the completion thereof. Therefore, even when the width of each of parts of the coating fluid to be continuously removed is set at a fixed value based on the anticipated extent to which the coating fluid will spread on the mixture layer, the width of the coating fluid to be applied to the mixture layer continuously varies according to variations in the properties of the coating fluid. In view of the above, on condition that a porous refractory layer is present at a location where a core is cut and where the porous refractory layer should be essentially absent when an electrode is cut into pieces, burrs of the porous refractory layer may be produced at a location where the core is cut. When such burrs are mixed into final products, i.e., batteries, this causes short circuits inside the batteries, leading to a decrease in the reliability of the products.

The present invention is made based on the above-mentioned problems, and its object is to provide a battery with high reliability by stably forming linear portions of a porous layer each having a fixed width on the outer surface of an electrode.

A method for forming an electrode for a battery includes the step of rotating a gravure roll while allowing the gravure roll to abut against the surface of the moving electrode, thereby applying a coating fluid serving as a precursor of the porous layer to the surface of the electrode. In the step of applying the coating fluid, part of the coating fluid applied to the surface of the electrode is continuously removed by allowing a scraper to abut against the surface of the electrode, and the width of a part of the scraper abutting against the surface of the electrode is adjusted according to variations in the width of each of linear portions of the porous layer left after the removal of the part of the coating fluid.

Thus, feedback on variations in the width of each of the linear portions of the porous layer left after the removal of the part of the coating fluid is provided, and the width of the part of the scraper abutting against the surface of the electrode is adjusted. In this way, even when the width of each of linear portions of the spread coating fluid varies according to variations in the properties of the coating fluid with time, parts of the coating fluid each having a fixed width can be continuously removed. In this way, the linear portions of the porous layer can be formed to have a fixed shape, and thus a battery with high reliability can be provided.

DETAILED DESCRIPTION OF THE INVENTION

An embodiment of the present invention will be described hereinafter with reference to the drawings. In the following drawings, components having substantially the same function are denoted by the same reference numerals for simplicity of description. The present invention is not limited to the following embodiment.

Figure 1:
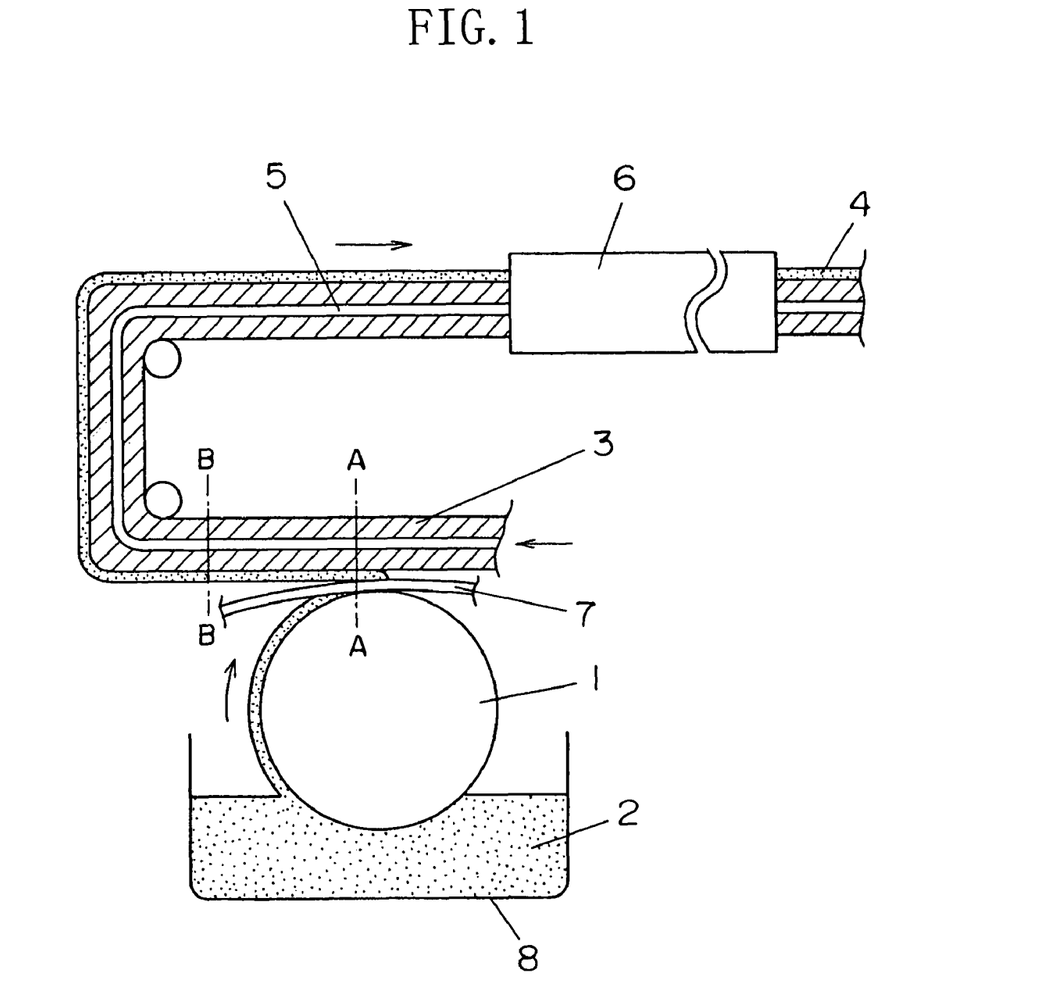
FIG. 1 is a schematic view illustrating a method for forming a porous layer according to an embodiment of the present invention.

FIG. 1 is a diagram for explaining a method for forming an electrode for a battery according to an embodiment of the present invention and a schematic view illustrating the process of forming a porous layer on the outer surface of the electrode.

The method for forming an electrode for a battery according to this embodiment includes the process step of preparing an electrode formed at its surfaces with mixture layers 3 containing an active material and the process step of forming a porous layer 4 along the length of the electrode. The process step of forming the porous layer 4 includes the substep of rotating a gravure roll 1 while allowing the gravure roll 1 to abut against the outer surface of the moving electrode (the outer one of the mixture layers 3), thereby applying a coating fluid 2 serving as a precursor of the porous layer 4 to the outer surface of the electrode (the outer one of the mixture layers 3). In the substep of applying the coating fluid 2, part of the coating fluid 2 applied to the outer surface of the electrode is continuously removed by allowing a scraper 7 to abut against the outer surface of the electrode (the outer one of the mixture layers 3). Furthermore, the width of a part of the scraper 7 abutting against the outer surface of the electrode (the outer one of the mixture layers 3) is adjusted according to variations in the width of each of linear portions of the porous layer 4 left after the removal of the part of the coating fluid 2.

More particularly, as illustrated in FIG. 1, the electrode in which the mixture layers 3 containing an active material are formed on a core 5 is continuously supplied outward from an uncoiler also serving as a driver (not shown) and allowed to travel in a specific direction. On the other hand, the gravure roll 1 formed with grooves (not shown) is placed inside a coating fluid tank 8 for storing the coating fluid 2 serving as the precursor of the porous layer 4.

The gravure roll 1 is allowed to abut against the outer surface of the electrode (specifically, the outer one of the mixture layers 3) and rotate oppositely to the direction in which the electrode travels. In this way, the coating fluid 2 stored in the coating fluid tank 8 is applied to the outer surface of the electrode along the grooves formed in the gravure roll 1. Part of the coating fluid 2 extending in parallel with the direction in which the electrode travels is continuously removed by allowing the scraper 7 (alternatively, a plurality of scrapers 7) to abut against the electrode (the outer one of the mixture layers 3 or the core 5), thereby forming linear portions of a porous layer 4 after the passage of the remaining parts of the coating fluid 2 through a dryer 6. Even when the width of each of linear portions of the spread coating fluid 2 varies according to variations in the properties of the coating fluid 2 with time, a part of the coating fluid 2 having a fixed width can be continuously removed by adjusting the width of a part of the scraper 7 abutting against the outer surface of the electrode according to variations in the width of each of the linear portions of the porous layer 4. In this way, the linear lines of the porous layer 4 can be formed to have a fixed shape, and thus a battery with high reliability can be provided.

Figure 5A:
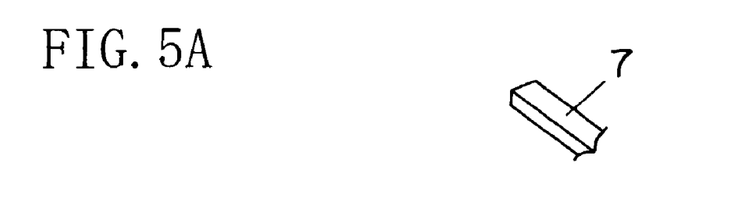
FIG. 5A is a schematic view illustrating the structure of a typical scraper.
Figure 5B:
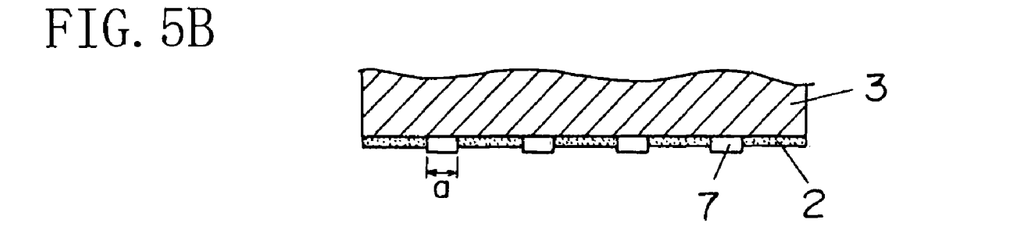
FIG. 5B is a schematic cross-sectional view taken along the line A-A in FIG. 1 when a plurality of scrapers are allowed to abut against the outer one of the mixture layers.
Figure 5C:
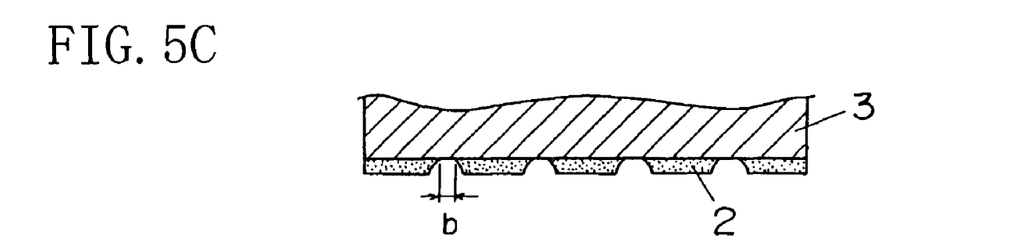
FIG. 5C is a schematic cross-sectional view taken along the line B-B in FIG. 1 when the fluidity of the coating fluid is low.
Figure 5D:
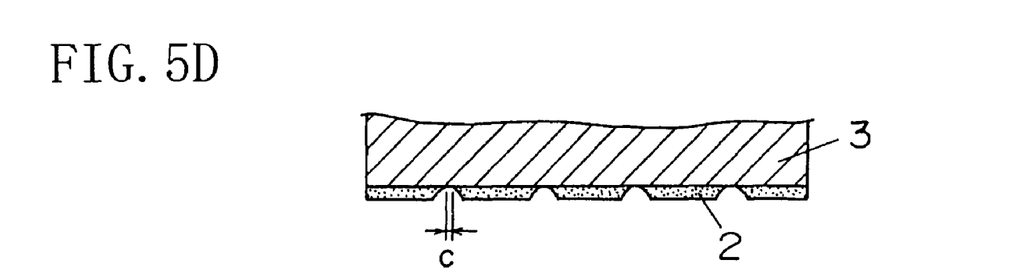
FIG. 5D is a schematic cross-sectional view taken along the line B-B in FIG. 1 when the fluidity of the coating fluid is low.

While referring to FIGS. 5A through 5D, a description will be given of how the width of each of linear portions of a coating fluid 2 obtained by partially removing the coating fluid 2 varies according to variations in the properties of the coating fluid 2 with time. FIG. 5A is a schematic view illustrating a typical scraper 7, and FIG. 5B is a cross-sectional view taken along the line A-A in FIG. 1 and illustrating how a plurality of scrapers 7 are allowed to abut against the outer one of mixture layers 3. FIGS. 5C and 5D are cross-sectional views taken along the line B-B in FIG. 1. FIG. 5C illustrates the state of the coating fluid 2 partially removed when the coating fluid 2 has a low fluidity, and FIG. 5D illustrates the state of the coating fluid 2 partially removed when the coating fluid 2 has a high fluidity.

Since the coating fluid 2 is a Newtonian fluid as described above, even when scrapers 7 each having a width a are allowed to abut against the outer one of the mixture layers 3, the width of each of exposed parts of the outer one of the mixture layers 3 becomes smaller than the width a due to the spreading of the coating fluid 2. If the coating fluid 2 always has the same characteristics, the width a of each scraper 7 can be set based on the width of each of linear portions of the spread coating fluid 2. However, in fact, as illustrated in FIG. 5C or 5D, the width b or c (b>c) of each exposed part of the outer one of the mixture layers 3 also varies according to the fluidity of the coating fluid 2. Therefore, unless the width a of the scraper 7 is freely changed, the width of the exposed part of the outer one of the mixture layers 3 cannot be fixed.

Figure 2A:
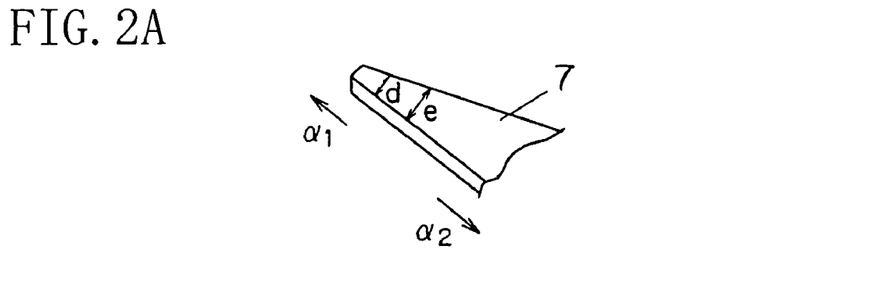
FIG. 2A is a schematic view illustrating the structure of a scraper according to the embodiment of the present invention.

As illustrated in FIG. 2A, a scraper 7 is tapered such that the width of a part of a coating fluid 2 to be continuously removed can be changed. The width of a part of the scraper 7 abutting against the outer one of mixture layers 3 is adjusted according to variations in the width of each of exposed parts of the outer one of the mixture layers 3. The width variations are associated with variations in the amount of the coating fluid 2 spread out. In view of the above, the width of the exposed part of the outer one of the mixture layers 3 or the width of each of linear portions of the porous layer 4 can be kept fixed.

Figure 2B:
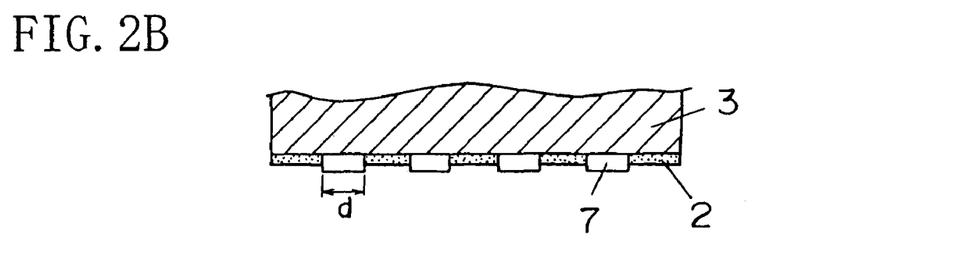
FIG. 2B is a schematic cross-sectional view taken along the line A-A in FIG. 1 when the fluidity of a coating fluid is low.
Figure 2C:
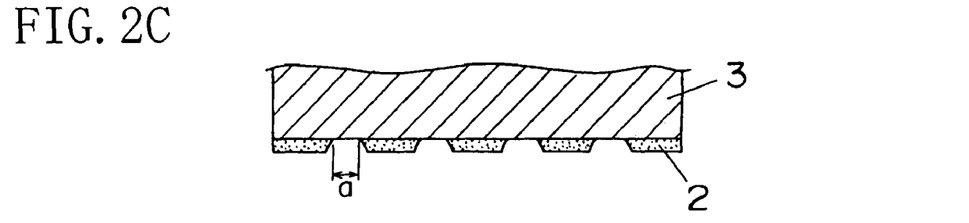
FIG. 2C is a schematic cross-sectional view taken along the line B-B in FIG. 1 when the fluidity of the coating fluid is low.
Figure 2D:
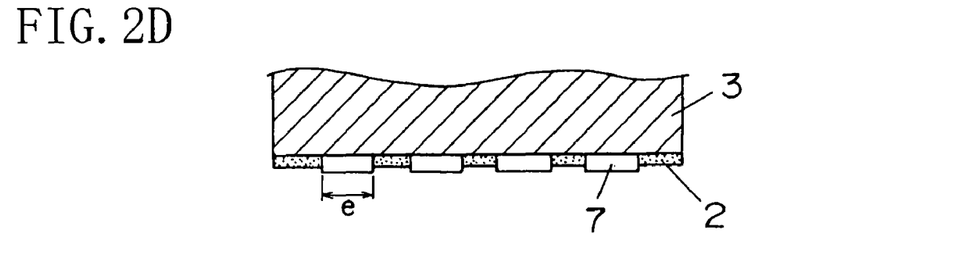
FIG. 2D is a schematic cross-sectional view taken along the line A-A in FIG. 1 when the fluidity of the coating fluid is high.
Figure 2E:
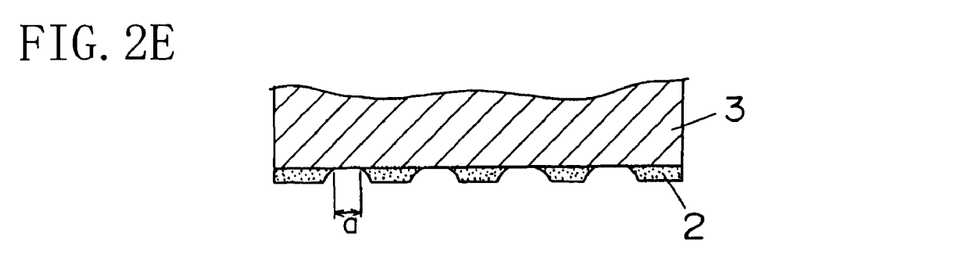
FIG. 2E is a schematic cross-sectional view taken along the line B-B in FIG. 1 when the fluidity of the coating fluid is high.

When the coating fluid 2 has a low fluidity, the width of a part of each of scrapers 7 allowed to abut against the outer one of the mixture layers 3 is set at d as illustrated in FIG. 2B such that the width of each exposed part of the outer one of the mixture layers 3 becomes a desired value a (d>a) as illustrated in FIG. 2C. In a case where the fluidity of the coating fluid 2 is increased due to settling or other causes and the width of the exposed part of the outer one of the mixture layers 3 becomes smaller than the width a, the scraper 7 is moved in the direction illustrated by the arrow $\alpha_1$ (leftward in FIG. 1), and the width of a part of the scraper 7 allowed to abut against the outer one of the mixture layers 3 is set at e (e>d>a) as illustrated in FIG. 2D. In this way, the width of the exposed part of the outer one of the mixture layers 3 can be returned to the desired value a as illustrated in FIG. 2E.

When addition of a coating fluid 2 for a new production lot and other processes decrease the fluidity of the coating fluid 2 and the width of each of exposed parts of the outer one of the mixture layers 3 consequently becomes larger than the width a, each scraper 7 is moved in the direction illustrated by the arrow $\alpha_2$ (rightward in FIG. 1), and the width of a part of the scraper 7 allowed to abut against the outer one of the mixture layers 3 is returned to d as illustrated in FIG. 2B. In this way, the width of the exposed part of the outer one of the mixture layers 3 can be returned to the desired value a as illustrated in FIG. 2C.

FIGS. 3A through 3E are schematic views illustrating another embodiment in which the width of a part of each of scrapers 7 allowed to abut against the outer surface of an electrode is adjusted.

Figure 3A:
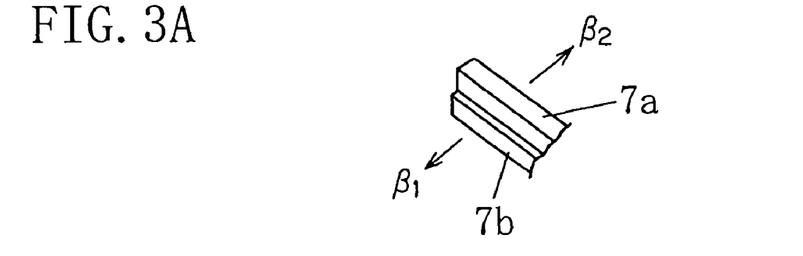
FIG. 3A is a schematic view illustrating the structure of a scraper according to another embodiment of the present invention.

As illustrated in FIG. 3A, the scraper 7 includes a plurality of scraper portions 7a and 7b. The width of a part of the scraper 7 abutting against the outer surface of the electrode is adjusted by changing the width of a part of the scraper portion 7a covered with the scraper portion 7b.

More particularly, when the coating fluid 2 has a low fluidity, the width d of a part of the scraper 7 allowed to abut against the outer one of the mixture layers 3 is set according to the width of a part of the scraper portion 7a (having a width $b_1$) covered with the scraper portion 7b (having a width $b_2$). In this way, as illustrated in FIG. 2C, the width of each of exposed parts of the outer one of the mixture layers 3 is adjusted to have a desired value a (d>a). In a case where the fluidity of the coating fluid 2 is increased due to settling or other causes and the width of the exposed part of the outer one of the mixture layers 3 becomes smaller than the width a, the scraper 7 is moved in the direction illustrated by the arrow $\beta_1$ (frontward in FIG. 1), and the width of a part of the scraper 7 allowed to abut against the outer one of the mixture layers 3 is set at e (e>d>a) as illustrated in FIG. 3D. In this way, the width of the exposed part of the outer one of the mixture layers 3 can be returned to the desired value a as illustrated in FIG. 3E.

Figure 3B:
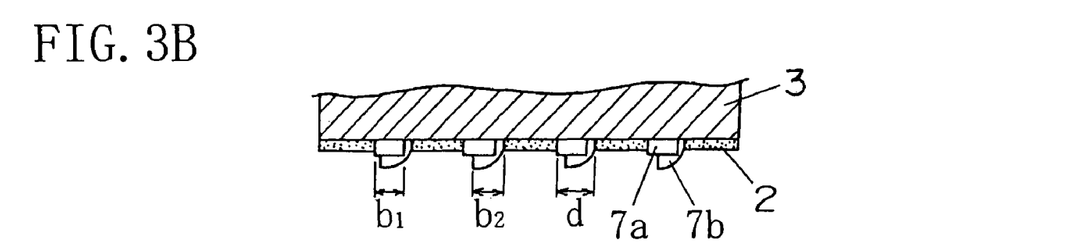
FIG. 3B is a schematic cross-sectional view taken along the line A-A in FIG. 1 when the fluidity of a coating fluid is low.
Figure 3C:
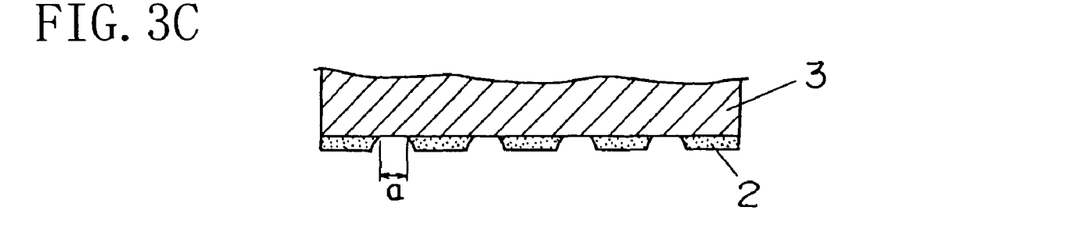
FIG. 3C is a schematic cross-sectional view taken along the line B-B in FIG. 1 when the fluidity of the coating fluid is low.
Figure 3D:
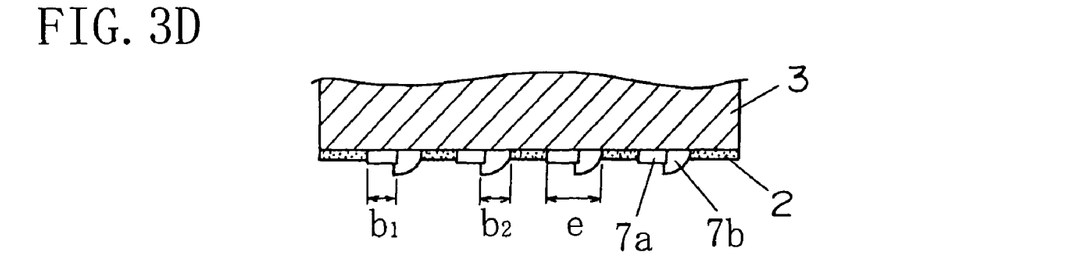
FIG. 3D is a schematic cross-sectional view taken along the line A-A in FIG. 1 when the fluidity of the coating fluid is high.
Figure 3E:
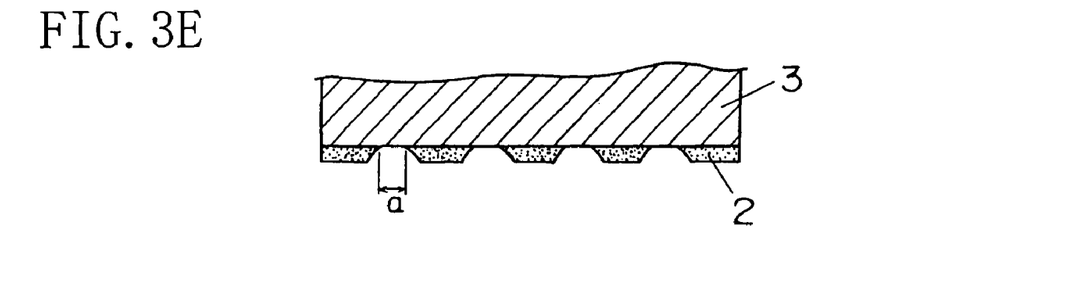
FIG. 3E is a schematic cross-sectional view taken along the line B-B in FIG. 1 when the fluidity of the coating fluid is high.

When addition of a coating fluid 2 for a new production lot and other processes decrease the fluidity of the coating fluid 2 and the width of each of exposed parts of the outer one of the mixture layers 3 consequently becomes smaller than the width a, the scraper portion 7b is moved in the direction illustrated by the arrow $\beta_2$ (rearward in FIG. 1), and the width of a part of the scraper portion 7a covered with the scraper portion 7b is returned to the initial value such that the width of a part of the scraper 7 allowed to abut against the outer one of the mixture layers 3 becomes d as illustrated in FIG. 3B. In this way, the width of the exposed part of the outer one of the mixture layers 3 can be returned to the desired value a as illustrated in FIG. 3C.

The lower one 7b of the scraper portions 7a and 7b is preferably made of a high-flexibility material that is likely to become deformed and can be in close contact with the outer one of the mixture layers 3. For example, a thin film made of polyethylene terephthalate (PET), polypropylene or any other material can be used as a material of the scraper portion 7b. The thicknesses of the scraper portions 7a and 7b preferably fall within a range of 0.03 through 0.1 mm considering that the scraper portions 7a and 7b should have sufficient mechanical strengths while being helped to sufficiently become deformed.

In this embodiment, a description was given of a case where the plurality of linear portions of the coating fluid 2 are formed on the outer one of the mixture layers 3. However, the same effect can be provided also when a plurality of linear portions of a mixture layer 3 exist and are coated with associated linear portions of a coating fluid 2. In this case, a part of the electrode allowed to abut against each of the scrapers 7 (a region of the electrode from which the coating fluid 2 is removed) may be a region thereof at which the core 5 is exposed. However, the scraper 7 is preferably allowed to abut against at least an end part of the mixture layer 3. The reason for this is that many linear portions of a porous layer 4 each having substantially the same width as each linear portion of the mixture layer 3 can be certainly formed by utilizing the spreading of the coating fluid 2.

In this embodiment, four scrapers 7 are allowed to abut against the outer one of mixture layers 3 while being spaced at substantially regular intervals to each extend along the length of the mixture layer 3, thereby applying five linear portions of the coating fluid 2 to the mixture layer 3. However, for example, in a case where a scraper 7 is allowed to abut against substantially the middle of a mixture layer 3, two linear portions of a coating fluid 2 are applied to the mixture layer 3. Alternatively, in a case where two scrapers 7 are allowed to abut against both lateral end parts of a mixture layer 3, a linear coating fluid 2 may be applied to substantially the middle of the mixture layer 3.

The core 5 to which the mixture layers 3 have been applied is divided into pieces by dividing its region in which the porous layer 4 is not formed. In other words, the core 5 to which the mixture layers 3 have been applied is divided between adjacent ones of the linear portions of the porous layer 4. In this manner, a plurality of electrodes can be simultaneously produced.

An apparatus for forming an electrode for a battery using the method for forming an electrode for a battery of this embodiment can be configured as illustrated in FIG. 1. More particularly, the apparatus includes a first driver (not shown) for allowing an electrode formed at its surfaces with mixture layers 3 to travel in a specific direction, a coating fluid tank 8 for storing a coating fluid 2 serving as a precursor of a porous layer, a second driver (not shown) for rotating a gravure roll 1 in a specific direction while allowing the gravure roll 1 to abut against the outer surface of the electrode allowed to travel by the first driver, a controller (not shown) for controlling the width of a part of a scraper 7 abutting against the outer surface of the electrode, and a dryer for drying the coating fluid 2 applied to the outer surface of the electrode.

The coating fluid 2 stored in the coating fluid tank 8 is applied to the outer surface of the electrode along a plurality of grooves (not shown) formed in the circumferential surface of the gravure roll 1 that rotates using the second driver. Furthermore, part of the coating fluid 2 applied to the outer surface of the electrode is continuously removed by the scraper 7 allowed to abut against the outer surface of the electrode. When the scraper 7 is configured, for example, as illustrated in FIGS. 2A and 3A, this permits variations in the width of a part of the scraper 7 allowed to abut against the outer surface of the electrode.

The apparatus may further include a sensor (not shown) for sensing the width of each of linear portions of the porous layer 4 left after removal of part of the coating fluid 2. This allows the controller to adjust the width of the part of the scraper 7 abutting against the outer surface of the electrode with high accuracy according to variations in the width of the linear portion of the porous layer 4 sensed by the sensor. The width of a part of the electrode (the mixture layer 3) exposed after the removal of the part of the coating fluid 2 may be sensed without sensing the width of the linear portion of the porous layer 4.

A refractory material having a much higher melting point or thermal decomposition temperature than 200° C. is preferably used as a material of the porous layer 4 of the present invention. More specifically, a refractory resin, such as polytetrafluoroethylene (PTFE), polyimide and polyamide, an inorganic oxide filler, such as alumina and magnesia, or any other material can be used. In order to ensure the adhesion between the porous layer 4 and an electrode to be coated with the porous layer 4, a binder, e.g., polyvinylidene fluoride (PVDF), acrylic rubber particles (この意味でよい　かご確認下さい) (for example, BM-500B manufactured by Zeon corporation, Japan) or any other material, is preferably added to the porous layer 4. The binder has the advantages of not only possessing appropriate heat resistance but also holding gaps in the porous layer 4 and thus maintaining the ion conductivity of the porous layer 4 due to reduced electrolyte-swellability. When the coating fluid 2 serving as a precursor of the porous layer 4 is prepared, the above-described material is preferably dispersed or dissolved into a polar organic solvent, such as N-methyl-2-pyrrolidene (NMP).

In a case where an electrode to be coated with the coating fluid 2 is a precursor of a negative electrode of a nonaqueous electrolyte secondary battery, not only a carbonaceous material, such as graphite, but also a high-capacity material containing at least one of elements that can be alloyed with lithium having a theoretical capacitance density of 400 mAh/g or more can be used as an active material. The elements that can be alloyed with lithium include Al, Zn, Ge, Cd, Sn Pb, and any other element. In particular, Si and Sn are preferably used as the elements that can be alloyed with lithium, because use of Si and Sn provides a material in which a large amount of lithium can be stored and Si and Sn are easily available. Various materials, such as a single element, e.g., Si alone or Sn alone, an oxide, e.g., $SiO_x$ ($0<x<2$) or $SnO_x$ ($0<x\leq2$), an alloy containing a transition metal element, e.g., a Ni—Si alloy, a Ti—Si alloy, a Mg—Sn alloy, Fe—Sn alloy, or any other alloy, can be used as the material containing Si or Sn.

In a case where a method in which a particle-like active material is applied onto a core 5 is employed, PVDF, a styrene-butadiene copolymer (SBR), or a modification of acrylic acid based polymer can be used as a binder. In a case where water-based paste is applied, as the binder, to the core 5, use of carboxy methyl cellulose (CMC), polyacrylic acid or any other material as a water soluble thickener increases the stability of the paste. Many of the above-mentioned high-capacity materials exhibit poor electrical conductivity. Therefore, graphite, such as artificial graphite, carbon blacks, such as acetylene black or Ketjen black, carbon fibers, or any other material is preferably added, as a conductive agent, to the high-capacity material. Mixture layers 3 are formed by forming the above-mentioned materials on the core 5. A metal foil made of copper, copper alloy, or any other metal or a porous body (such as lath metal or foam metal) can be used for the core 5.

In a case where an electrode to be coated with the coating fluid 2 is a precursor of a positive electrode of a nonaqueous electrolyte secondary battery, $LiCoO_2$, $LiNi_xCo_yO_2$ ($x+y=1$), or $LiNi_xMn_yCO_zO_2$ ($x+y+z=1$) can be used as an active material. Since a method in which a particle-like active material is applied onto a core 5 is employed, PVDF, PTFE, or any other material can be used as a binder. In a case where water-based paste is applied, as the binder, to the core 5, CMC, polyacrylic acid or any other material can be used for a water soluble thickener. The above-mentioned high-capacity materials exhibit poor electrical conductivity. Therefore, graphite, such as artificial graphite, carbon blacks, such as acetylene black or Ketjen black, carbon fibers, or any other material is preferably added, as a conductive agent, to the high-capacity material. Mixture layers 3 are formed by forming the above-mentioned materials on the core 5. A metal foil made of aluminum, aluminum alloy, nickel, or any other metal or a porous body (such as lath metal or foam metal) can be used for the core 5.

In Examples, the present invention will be described hereinafter in more detail.

EXAMPLE 1

As illustrated in FIG. 1, a negative electrode hoop in which mixture layers 3 are formed on both surfaces of a core 5 made of 10-μm-thick copper foil to each have a graphite-to-SBR-to-CMC weight ratio of 100:1:1 was wound in a coil form and then attached to an uncoiler also serving as a driver. The negative electrode hoop has a thickness of 150 μm, an active material density of 1.6 g/ml, an overall width of 200 mm. The width of each of the mixture layers 3 is 180 mm, the width of each of exposed parts of the core 5 located to both sides of the mixture layer 3 is 10 mm, and a piece of the negative electrode hoop has a length of 100 m. Meanwhile, a coating fluid 2 in which the weight ratio of alumina (AES-12 manufactured by Sumitomo Chemical Co., Ltd.) to PVDF serving as a binder (#1320 manufactured by Kureha Corporation) to NMP serving as a solvent is 100:42:113 was stored in a coating fluid tank 8. A gravure roll 1 formed at its circumferential surface with grooves 7 was placed so as to be partially immersed in the coating fluid 2. The width of the circumferential surface of the gravure roll 1 is 180.5 mm, the diameter of the gravure roll 1 is 120 mm, the width of each of grooves 7 is 0.2 mm, the depth thereof is 0.1 mm, the distance between adjacent ones of the grooves 7 is 0.25 mm, and the angle of inclination of each groove 7 is 45°.

A negative electrode hoop was moved from the uncoiler at a rate of 3 m/min, and the lower one of the mixture layers 3 of the negative electrode hoop was allowed to abut against the top end of the gravure roll 1. Thereafter, the negative electrode hoop is introduced into a drying furnace 6 (having a length of 2 m) and then dried at a temperature of 120° C. In this way, a porous refractory layer 4 was formed on the outer surface of the outer one of the mixture layers 3 to have an average thickness of 4 μm and again wound in a coil form by a coiler (not shown). A 0.05-mm-thick and 7-through 20-mm-wide tapered PET film (a scraper 7) was placed between the outer one of the mixture layers 3 and the gravure roll 1. The width of each of exposed parts of the outer one of the mixture layers 3 under consideration of the spreading of the coating fluid 2 was set at 10 mm. When a microscope (sensor) placed between the drying furnace 6 and the coiler sensed that the width of the exposed part of the outer one of the mixture layers 3 after completion of the spreading of the coating fluid 2 was 5% or more larger or smaller than the set value, the width of a part of the scraper 7 abutting against the outer one of the mixture layers 3 was allowed to be changed according to the difference between the set value and the actual width of the exposed part by the controller. The rotational speed of the gravure roll 1 was set at 4 m/min, and the direction of rotation of the gravure roll 1 was set to be opposite to the direction in which the negative electrode travels. The coating fluid tank 8 was refilled with the coating fluid 2 three times.

EXAMPLE 2

Unlike Example 1, as illustrated in FIG. 3B, pairs of 0.05-mm-thick and 10-mm-wide PET films (pairs of scraper portions 7a and 7b) are allowed to abut against the outer one of mixture layers 3 while the scraper portions 7b overlap the scraper portions 7a. Parts of the coating fluid 2 on which the pairs of scraper portions 7a and 7b are located are continuously removed along the direction of movement of a negative electrode. In this way, five linear portions of a porous refractory layer 4 are formed in the same manner as in Example 1 under the same conditions as in Example 1 and again wound in a coil form by a coiler (not shown). The width of each of exposed parts of the outer one of the mixture layers 3 under consideration of the spreading of the coating fluid 2 was set at 10 mm like Example 1. When a microscope (sensor) placed between the drying furnace 6 and the coiler sensed that the width of the exposed part of the outer one of the mixture layers 3 after completion of the spreading of the coating fluid 2 was 5% or more larger or smaller than the set value, the width of a part of each of the scraper portions 7a covered with associated one of the scraper portions 7b was allowed to be changed according to the difference between the set value and the actual width of the exposed part by a controller.

COMPARATIVE EXAMPLE 1

Unlike Example 1, as illustrated in FIG. 4B, 0.05-mm-thick and 10-mm-wide PET films (scrapers 7) are allowed to abut against the outer one of mixture layers 3. Parts of the coating fluid 2 on which the scrapers 7 are located are continuously removed along the direction of movement of a negative electrode. In this way, five linear portions of a porous refractory layer 4 are formed in the same manner as in Example 1 under the same conditions as in Example 1 and again wound in a coil form by a coiler (not shown). Although the width of each of exposed parts of the outer one of the mixture layers 3 under consideration of the spreading of the coating fluid 2 was set at 10 mm like Example 1, the width of the exposed part of the outer one of the mixture layers 3 after completion of the spreading of the coating fluid 2 was neither sensed nor controlled.

The negative electrode of each of the above-described examples and comparative example was uncoiled from the coiler. The width of each of the exposed parts of the outer one of the mixture layers 3 was measured every meter along the length of the negative electrode. In this way, the average width of the exposed part of the outer one of the mixture layers 3 and the range of variation a in the width thereof were determined. The results are illustrated in FIG. 4.

Figure 4:
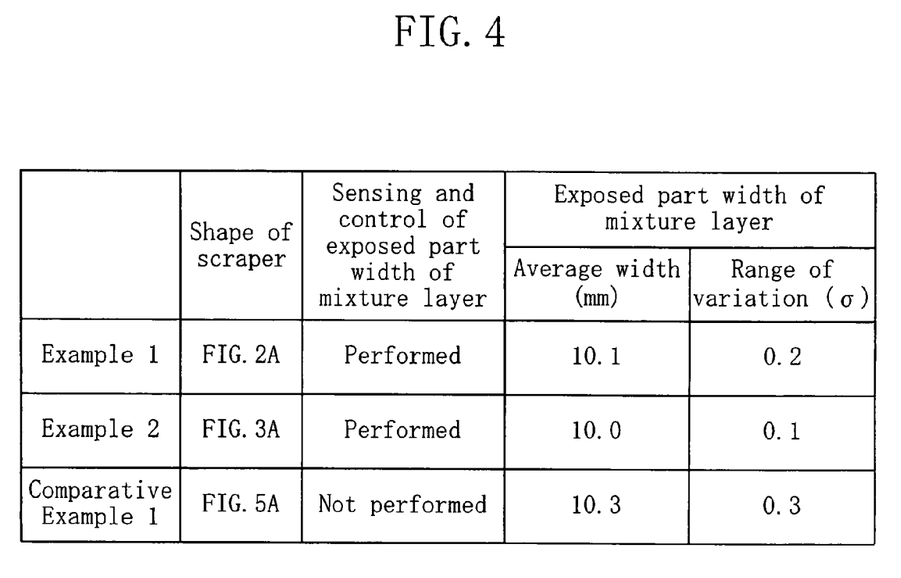
FIG. 4 is a table illustrating the results obtained by measuring the range of variation in the width of each of exposed parts of the outer one of mixture layers of the present invention.

As illustrated in FIG. 4, in Comparative Example 1 in which a scraper 7 is simply allowed to abut against the outer one of mixture layers 3 and the width of each of exposed parts of the outer one of the mixture layers 3 after completion of the spreading of a coating fluid 2 was neither sensed nor controlled, the average width of the exposed part depends on variations in the properties of the coating fluid 2 which are associated with the settling or addition of the coating fluid 2 and therefore deviates from the set value. In addition, the range of variation in the width of the exposed part was large.

On the other hand, in Examples 1 and 2 of the present invention, the width of the scraper 7 was able to be changed according to variations in the properties of the coating fluid 2. Therefore, the average width of the exposed part of the outer one of the mixture layers 3 was substantially the same as the set value. In addition, the range of variation in the width of the exposed part was able to be reduced.

Although the present invention was described above with reference to the preferred embodiments, the above description is not limited and can be certainly modified in various ways. The type of secondary batteries to which the present invention is applied is not particularly limited, and the present invention can be applied to not only lithium ion secondary batteries but also nickel hydrogen storage batteries and other batteries. Furthermore, also when the present invention is applied to electrochemical elements (e.g., condensers) having the same current-collecting structure as that of the present invention, the same effect can be provided.

In the present invention, in order to adjust the width of a part of a scraper 7 abutting against the outer surface of an electrode, feedback on variations in "the width of each of linear portions of a porous layer 4" left after removal of part of a coating fluid 2 is provided. This feedback naturally includes feedback on variations in "the width of each of parts of the electrode (the outer one of mixture layers 3)" exposed after the removal of part of the coating fluid 2.

What is claimed is:

1. A method for forming an electrode for a battery, said method comprising the steps of:
preparing an electrode formed at its surface with a mixture layer containing an active material and
forming a porous layer along the length of the electrode,
the step of forming the porous layer comprising the substep of
rotating a gravure roll oppositely to the direction of movement of the electrode while allowing the gravure roll to abut against the surface of the moving electrode, thereby applying a coating fluid serving as a precursor of the porous layer to the surface of the electrode,
wherein in the substep of applying the coating fluid, part of the coating fluid applied to the surface of the electrode is continuously removed by allowing a scraper to abut against the surface of the electrode, and
a width of a part of the scraper abutting against the surface of the electrode is adjusted according to variations in the width of the porous layer left after the removal of the part of the coating fluid.

2. The method of claim 1 further comprising the steps of:
allowing the scraper to abut against the surface of the electrode, the scraper being provided plural in number, so that the plurality of scrapers abut against a plurality of parts of the surface of the electrode, thereby forming a plurality of linear portions of the porous layer; and
dividing the electrode between adjacent ones of the linear portions of the porous layer.

3. The method of claim 2, wherein
the mixture layer is divided into a plurality of linear portions along the length of the electrode, and
the plurality of linear portions of the porous layer are formed on the plurality of associated linear portions of the mixture layer.

4. The method of claim 1, wherein the coating fluid serving as the precursor of the porous layer is a Newtonian fluid.

5. The method of claim 1, wherein
the scraper is tapered, and
the width of the part of the scraper abutting against the surface of the electrode is adjusted by changing the part of the tapered scraper abutting against the surface of the electrode.

6. The method of claim 1, wherein
the scraper includes a plurality of scraper portions, and
the width of the part of the scraper abutting against the surface of the electrode is adjusted by changing the width of a part of one of the scraper portions covered with another of the scraper portions.

7. The method of claim 6, wherein the scraper is made of a material capable of being deformed when the scraper abuts against the surface of the electrode.

8. The method of claim 1, wherein the step of forming the porous layer further includes the substep of drying the coating fluid applied to the surface of the electrode.

* * * * *